United States Patent

Anacker

[15] 3,643,237

[45] Feb. 15, 1972

[54] MULTIPLE-JUNCTION TUNNEL DEVICES

[72] Inventor: Wilhelm Anacker, Yorktown Heights, N.Y.

[73] Assignee: International Business Machines Corporation, Armonk, N.Y.

[22] Filed: Dec. 30, 1969

[21] Appl. No.: 889,101

[52] U.S. Cl. ....................340/173.1, 307/245, 307/306

[51] Int. Cl. ....................G11c 11/44, G11c 5/02

[58] Field of Search ....................340/173.1; 307/306, 277, 245

[56] References Cited

UNITED STATES PATENTS

| | | | |
|---|---|---|---|
| 3,521,133 | 7/1970 | Beam | 307/306 X |
| 3,564,351 | 2/1971 | McCumber | 307/306 X |
| 3,573,661 | 4/1971 | McCumber | 307/306 X |
| 3,573,662 | 4/1971 | Fulton | 307/306 X |
| 3,356,864 | 12/1967 | Giaever | 340/173.1 X |
| 3,222,655 | 12/1965 | Slade | 340/173.1 |
| 3,346,829 | 10/1967 | Newhouse et al. | 340/173.1 X |
| 3,275,930 | 9/1966 | Cassidy et al. | 340/173.1 X |
| 3,541,532 | 11/1970 | Newhouse et al. | 340/173.1 |
| 3,528,066 | 9/1970 | Bremer | 340/173.1 |
| 3,512,017 | 5/1970 | Pierce et al. | 340/173.1 X |
| 3,281,609 | 10/1966 | Rowell | 340/173.1 X |

*Primary Examiner*—Stanley M. Urynowicz, Jr.
*Attorney*—Hanifin and Jancin and Jackson E. Stanland

[57] ABSTRACT

Switching and memory circuits which employ tunneling devices having nonlinearities are made more reliable by making each device a series arrangement of tunnel junctions. This built-in redundancy of each switching element eliminates problems due to frequent device short circuits, especially where there are thin tunnel barriers and the devices are operated under extreme temperature ranges. In a particular case, Josephson devices are used, each of which is a thin film structure having stacked junctions, i.e., a plurality of alternate layers of metal and tunnel barrier.

9 Claims, 8 Drawing Figures

INVENTOR
WILHELM ANACKER

BY J. E. Stanland

AGENT

MULTIPLE-JUNCTION TUNNEL DEVICES

BACKGROUND OF THE INVENTION

1. Field of the Invention

This invention relates to tunnel devices and to memory and switching circuits having tunnel devices as current-steering elements. In particular, the current-steering elements are Josephson tunneling devices.

2. Description of the Prior Art

It is presently known that tunneling devices, and in particular superconductive tunneling devices are useful as current-steering elements in both logic and memory circuits. In addition, Josephson tunneling devices are known as superconductive tunneling devices having switchable voltage states. Josephson devices have been previously proposed for use in logic and memory circuits, but problems have developed in the fabrication of such circuitry. One problem which has occurred often, and is more apparent in large arrays of such devices, concerns junction shorting. By this, it is meant that short circuits develop across thin tunnel barriers due to fabrication difficulties and to whisker growth.

Although researchers are working on solutions to this problem, as yet there is no effective means for eliminating or substantially reducing device failure due to junction shorts.

Accordingly, it is an object of this invention to provide tunnel devices which have minimal failure due to junction shorting.

It is another object of this invention to provide switching circuitry using tunnel devices which circuitry is easy to fabricate, having minimal electrical and mechanical failure.

It is still another object of this invention to provide logic and memory arrays using tunnel devices, which can be cycled over wide temperature ranges with minimal device failure.

SUMMARY OF THE INVENTION

It has been recognized that the primary cause for failure in circuitry employing tunnel junctions as switching elements is that due to junction shorting. To overcome this problem, each switching element is comprised of a series of tunnel junctions, the series of such junctions operating as one element. That is, each tunnel device is comprised of a series of alternately spaced superconducting electrodes and tunnel barriers, forming stacks containing multiple tunnel junctions. All junctions in a device are part of the tunnel current path through the device. In a preferred case, three or four junctions comprise a series.

In particular, each switching element can be a Josephson device. Each device is comprised of a stack of N (N=2, 3, 4,. . .) Josephson junctions which are prepared by repetitive deposition of superconductive films (at least as thick as twice the London penetration depth of about 1,000A.) and formation of the thin tunnel barriers. The N Josephson junctions of each stack form a series connection and the stacked multijunction device will function correctly when at least one single junction is not shorted. It will also function properly if more than one junction is operable. This is true since the condition for the existence of Josephson tunneling current—namely, a weak coupling between two superconductors—is fulfilled by the stacked structure.

As with conventional Josephson junctions, the multijunction device will switch from the pair tunneling state to the single particle tunneling state if the current threshold of a single operable junction is exceeded. Whether other operable junctions in the stack switch or not is irrelevant because this could only result in the development of an increased voltage drop across the stack.

Means are provided for switching each stacked tunnel device. In a preferred case, this switching means is an insulated overlying layer, the current through which sets up a magnetic field. The magnetic field intersects the stacked junctions and varies the switching threshold of the junctions, in a well-known manner.

These stacked junction devices are employed in either logic circuits or in memory arrays. The basic switching circuit is a two-branch, current-steering circuit, having a tunnel device in at least one branch. The tunnel device used is the stacked multijunction device described above.

In a memory array, which is either two or three dimensional, the same multijunction devices are used. As is the case with logic circuitry, there is a marked improvement in the fabrication yield of good tunnel devices. This leads to more reliable switching and memory circuitry. In addition, these circuits are easy to fabricate with existing techniques, since layered devices are proposed. Conventional evaporation and photoetching techniques, as well as sputtering, anodization, and other conventional fabrication techniques are suitable. All of these are well known to people of skill in the art.

Another preferred embodiment also employs stacked multijunctions for each device and, in addition, the junction area is divided into a number of isolated stacks. That is, each tunnel device comprises a plurality of islands, where each island is a stack of multijunctions. Again, this type of tunnel device can be used in logic and switching circuitry in order to provide circuitry having increased fabrication yield, with greatly diminished electrical shorting problems. The tunnel devices having several stacks throughout the surface area of the junction is very effective when the density of shorts per unit area is so large that the probability of one short per junction approaches unity.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
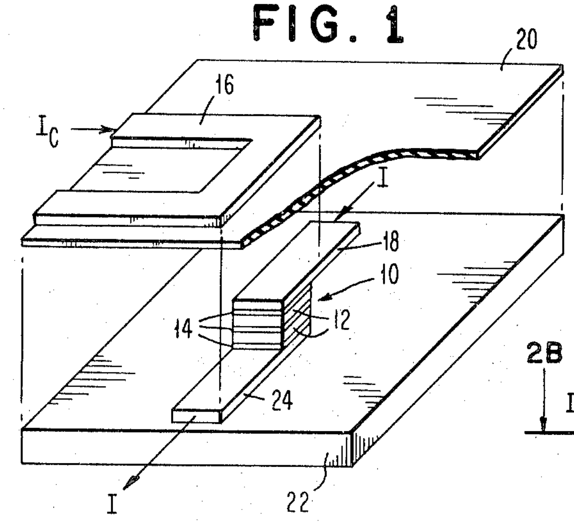
FIG. 1 is an illustration of a multijunction tunnel device according to the present invention.

FIG. 1 shows a tunnel device having a series arrangement 10 of tunnel junctions. That is, there is a multijunction stack 10 comprising alternate layers of current-carrying elements 12 and tunnel barriers 14. Generally, the current-carrying elements will be superconducting layers, while the tunnel barriers will be insulators, such as natural oxides. However, it will be readily apparent that any material which suffices for a potential barrier can be used as the tunnel barrier, while the current-carrying element can be metals, semimetals, etc. The tunnel barriers are weak coupling links between superconductors.

Overlying the multijunction stack is a control means, such as the current-carrying element 16, which is insulated from a top electrode 18 of the stack by insulation 20. The tunnel device is supported by a substrate 22, which can be a plurality of materials, including sapphire, quartz, mica, etc.

Current, designated I, flows into the electrodes 18 and tunnels through each tunnel barrier in the multijunction stack 10. The current, after tunneling through the successive barriers, then leaves the device via the other electrode 24.

The control means regulates the voltage state of the tunnel device. For instance, if the tunnel device is a Josephson tunneling gate, current flow through the control means will establish a magnetic field which intersects the tunnel barriers in the multijunction stack 10. The presence or absence of the magnetic field causes the Josephson gate switching threshold to be changed. The low-voltage state of the Josephson gate is a pair tunneling state, while the high-voltage state is a single particle tunneling state. Josephson tunneling gates are well known in the art, and a description of such devices is contained in an article by J. Matisoo, entitled "The Tunneling Cryotron—A Superconductive Logic Element Based On Electron Tunneling," published in the Proceedings of the IEEE, Vol. 55, No. 2, Feb. 1967, at pages 172–180.

Generally, there is only one junction in a tunnel device. In the preparation of such junctions, and especially where the tunnel barrier layer is very thin, it is not unusual that electrical shorts develop across the barrier. This causes device failure and the circuit operation of which the tunnel device is a part is correspondingly affected. By employing multijunction devices, there is a dramatic improvement in fabrication yield and the problem of electrical shorts is substantially reduced. The N-junctions of a stack are in series electrical arrangement and the stacked multijunction device will function correctly when at least one single junction is not shorted. The sensitivity of an individual junction threshold current to magnetic fields applied by the control means is approximately the same in both single-junction and multijunction arrangements, so controlled operation is unaffected.

The technique of providing stacked multijunctions is not only effective to reduce uniformly random failures, but also improves fabrication yield if a tendency prevails in the tunnel barrier formation process of producing either all good junctions or all bad junctions. In addition, this technique is compatible with fabrication processes using evaporation mask as well as photoetching techniques. The technique improves batch fabrication yield without imposing a penalty of requiring a greater area or a reduction in speed of operation. That is, this technique provides unexpectedly high fabrication yields without unduly high compensation elsewhere.

As an example of operation, consider the structure of FIG. 1, where the structure is a Josephson tunneling device. In this case, the metal layers 12, 18, 24 are superconductive films which are at least as thick as twice the London penetration depth of about 1,000 A. The tunnel barriers, in the usual case, will be oxides grown on the underlying superconductive layer. A Josephson junction has two tunneling states: a pair tunneling, and a single particle tunneling state. In order to more fully understand the operation of such a device, reference is made to FIG. 4, which shows a plot of current versus voltage for a Josephson tunneling device.

Josephson current can exist if the tunnel barrier is of the order of 2–50 A. This is the thickness of the actual potential barrier through which pairs must tunnel in order to establish Josephson current. Even at zero volts, Josephson current can tunnel through the junction until a critical current $I_{max}$ is reached. At this current, the device rapidly switches to a high voltage state, having a voltage $V_{max}$. The transition from $V_{max}$ to 0 voltage for decreasing current occurs at a current $I_{min}$ which is somewhat less than $I_{max}$, producing a hysteresis effect.

Figure 4:
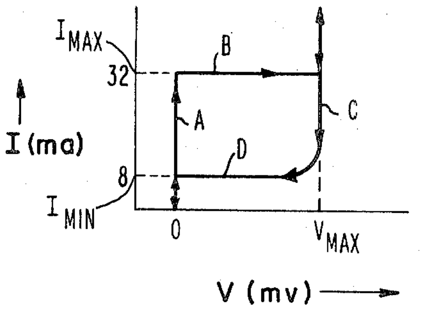
FIG. 4 is a current-versus-voltage plot of a Josephson tunnel device having multijunctions.

In FIG. 4, the flow of Josephson current through the junction produces no resultant voltage across the junction. Thus the curve traces out portion A. Because the device can carry only a limited supercurrent $I_{max}$, when this critical current is exceeded the device will switch abruptly to the usual current-voltage characteristics with a corresponding increase in voltage across the device to $V_{max}$. This is indicated by portion B of the curve. For decreasing current through the device, the transition from $V_{max}$ to zero voltage occurs at a current $I_{min}$ which is somewhat less than $I_{max}$. This is illustrated by portions C and D of the curve.

In the case of a Josephson tunneling device having a series of tunnel junctions in the form of a multijunction stack, the device operation is the same. If only one junction does not contain an electrical short, then the maximum voltage across the device is $V_{max}$. If more than one junction is good (no electrical shorts) then the voltage across the device may be $nV_{max}$, where *n* is the number of good junctions in the device. This occurs when each good junction has exactly the same switching threshold.

As with the conventional Josephson tunneling device having only one junction, the threshold current $I_{max}$ (switching threshold) of the device is changed by a magnetic field which passes through the various planes of the stacked junctions. When current through the control element induces a current greater than the current $I_{max}$ of any junction, the Josephson device will switch to its single particle tunneling state, which is a high voltage state.

The probability that a tunnel device will be good increases as the number of junctions increases. The improvement on the fabrication yield is estimated as follows. The probability $P(k, N, p)$ of the event of $k$ junctions being shorted in a stack of $N$ junctions, when the probabilities of fabricating shorted and operable junctions amounts to $p$ and $q=(1-p)$, respectively is given by the following expression:

$$P(k,N,p)=\binom{N}{k}p^k q^{(N-k)}$$

Based on the structure of a multiple-junction device in which case a failure occurs only if all junctions in the stack are shorted ($N=k$) which reduces the equation to $P(\text{failure})=p^N$. Generally, the use of three or four stacked junctions increases fabrication yield to a suitable extent, even if there is an extremely high rate of failure as the result of the fabrication process.

The threshold of a junction is higher if there is a short across the junction, since tunnel current exists through the rest of the surface area of that junction. Therefore, the threshold of that junction cannot be as easily controlled by an external magnetic field. However the multijunction device will operate satisfactorily if at least one good junction exists in the device.

Figure 2A:
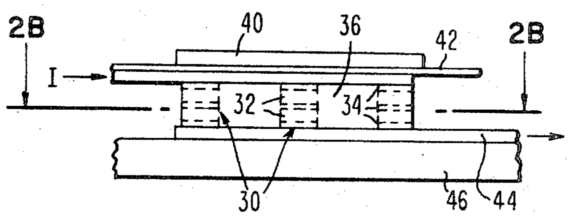
FIGS. 2A and 2B are illustrations of an alternate embodiment of a multijunction tunnel device, having a plurality of stacks each of which is comprised of multijunctions.
Figure 2B:
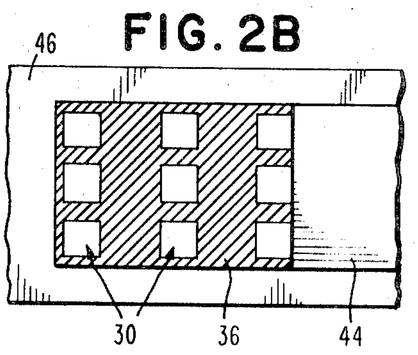

FIGS. 2A and 2B illustrate an embodiment in which there are separate stacks of junctions throughout the area of the tunnel device. This structure provides extremely high fabrication yields even when the density of shorts per unit area is so large that the probability of one short per junction approaches unity.

In FIG. 2A, the top and bottom electrodes are bridged by a plurality of stacked junctions 30. In addition to using N barrier layers on top of each other, the junction area is subdivided in M insulated islands, or stacks.

As in FIG. 1, each stack 30 is comprised of alternate current-carrying layers 32 and tunnel barriers 34. If a Josephson device is intended, the width of a tunnel barrier 34 will be approximately 2–50 A., while the metal layers will be at least about 1,000 A. In order to provide good isolation between stacks, insulation 36 is provided. Supported by the top electrode 38 is the control means 40 which is insulated from top electrode 38 by layer 42, which might be any suitable insulator, such as $SiO_2$. In the case of a Josephson device, the control means can be any superconductor. The bottom electrode 44 rests on insulating substrate 46.

FIG. 2B is a sectional top view of the structure of FIG. 2A. The plurality of M-islands 30 (or stacks) is shown throughout the area of the tunnel device. Operation of the device having a plurality of stacks across the junction area is the same as that of the device of FIG. 1. The device shown in FIGS. 2A and 2B could be a Josephson tunneling device, in which case the discussion above would apply.

Figure 3:
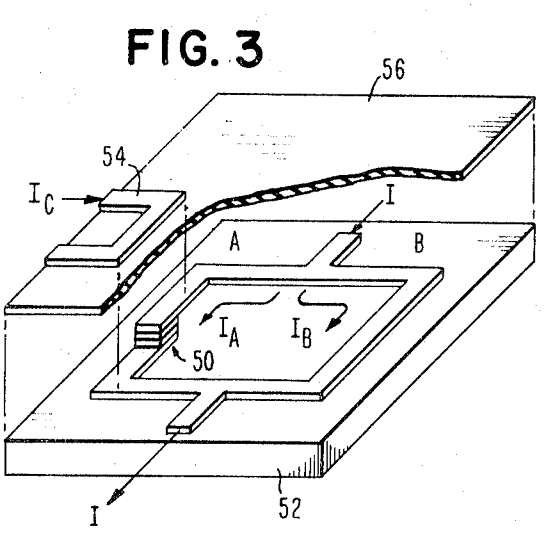
FIG. 3 is an illustration of a basic, two-branch circuit using the tunnel device of either FIG. 1 or FIG. 2.

A basic current-carrying circuit using the tunnel device of FIG. 1 or that of FIG. 2 is shown in FIG. 3. Here the circuit consists of two branches which are connected together at the input and the output. In the left-hand branch, designated A, there is a tunnel device 50 according to either FIG. 1 or FIG. 2. Although a tunnel device having two junctions is shown in FIG. 3, it is to be understood that the device can have a larger number of junctions. The current-steering circuit can be supported by a substrate 52, in the manner of that used in FIG. 1.

The operation of the circuit of FIG. 3 is as follows. Current I is provided by an external source such as a battery. This current flows into the two-branch circuit and divides equally into each branch $A$, $B$ if the tunnel device in branch $A$ is in its zero (low) voltage state. That is, $I_A = I_B$ when the tunnel device is in its zero voltage state. In the case of a Josephson tunnel device, each branch of the surface is superconducting and the Josephson device is in its pair tunneling state.

Application of a control current pulse $I_C$ to the control means 54 (supported on insulation 56) of the tunnel device causes the tunnel device to switch to its high-voltage state. When this occurs, an electromotive force is created which opposes the flow of current through branch A. Consequently, the total current is switched to branch B. Thus, a current-steering function is provided.

If the tunnel device in branch A is totally shorted, a high-voltage state sufficient to switch all of the current to branch B will not be provided. In that case, the circuit of FIG. 3 will fail and, if this is part of a larger system, further circuitry will be affected. By the use of the tunnel device shown in FIGS. 1 and 2, the likelihood of failure in an individual circuit is greatly minimized.

Figure 5:
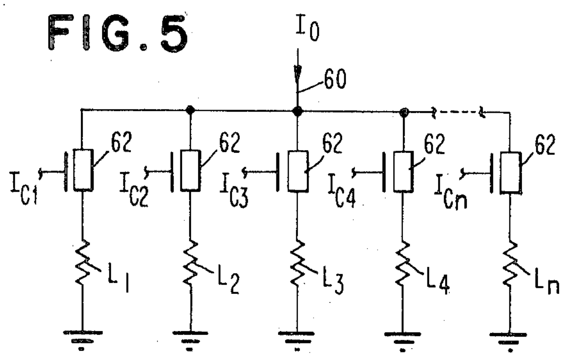
FIG. 5 is a decoder circuit using the tunnel device of either FIG. 1 or FIG. 2.

A switching circuit employing the device of FIGS. 1 and 2 and the current-steering principle indicated in FIG. 3 is provided by a decoder circuit, such as shown schematically in FIG. 5. In actual use, a binary tree decoder, of the type shown in U.S. patent application Ser. No. 744,749 filed July 15, 1968 now abandoned and assigned to the same assignee, is used.

In FIG. 5, there is an input line 60 for current $I_0$ which flows from an external source (not shown). Connected to this input line is a series of load lines, each of which has in it a tunnel device 62 according to FIG. 1 or FIG. 2. In this case, $n$ load lines are provided and the individual loads are indicated by resistaNces $L1, L2, \ldots L_n$. These loads may be any elements, such as memory elements, impedances, or other circuitry.

Each tunnel device is provided with a control means through which flows the current $I_{C_i}$, where $i=1, 2, \ldots n$.

When each tunnel device is in its low-voltage state, the input current $I_0$ will split into each load line according to the magnitude of the load $L_i$, where $i=1, 2, \ldots n$. To direct current to a particular load, all tunnel devices are put into their high-voltage state except that tunnel device which is connected to the load to be energized. This is achieved by applying current pulses $I_C$ to all tunnel devices not connected in series with the load to be energized. This is easily accomplished with logic circuitry which directs the current pulses $I_C$. Such circuitry is well known in the art, and particularly in the memory field.

Figure 6:
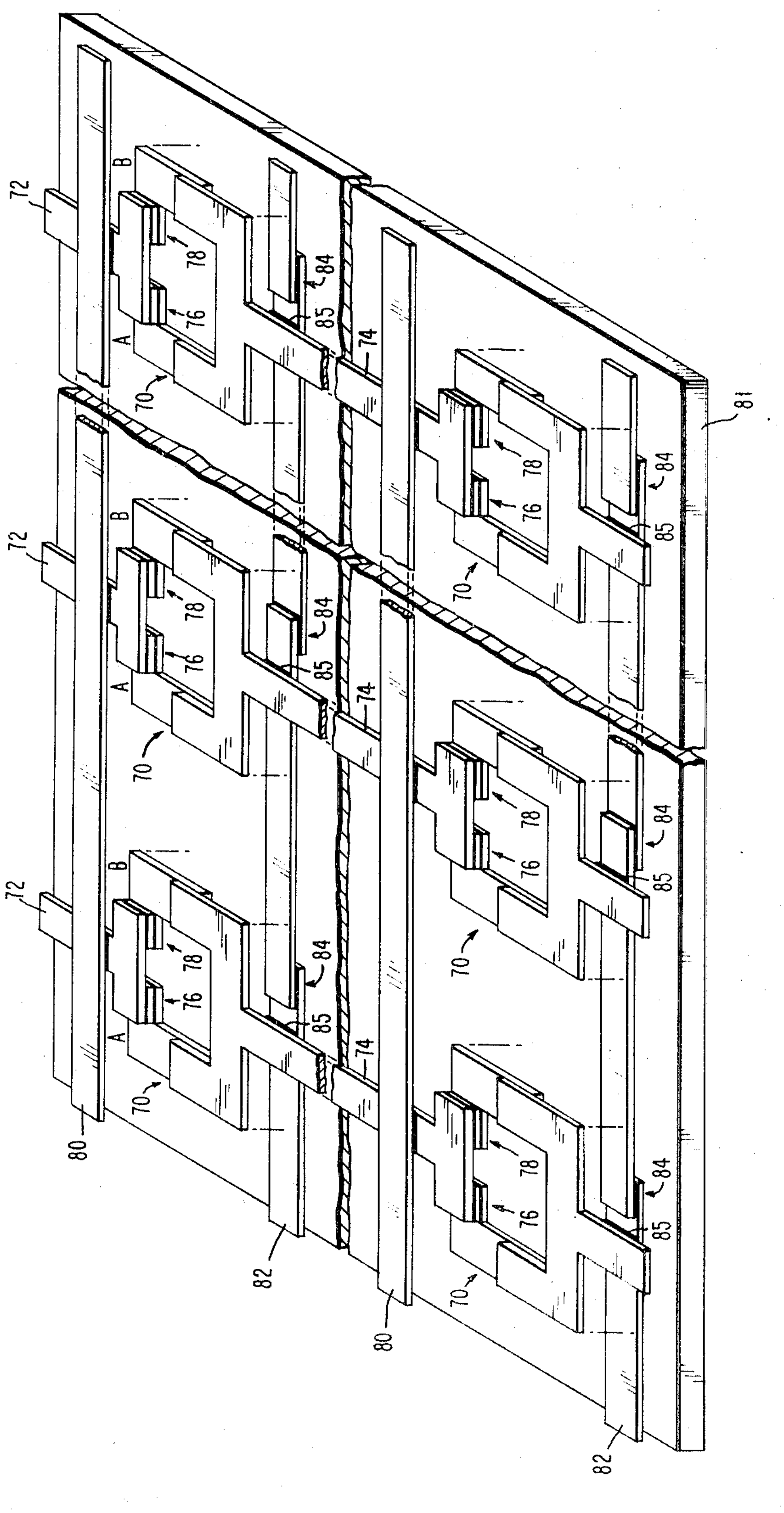
FIG. 6 is an illustration of a memory array using the tunnel devices of either FIG. 1 or FIG. 2.
Figure 7:
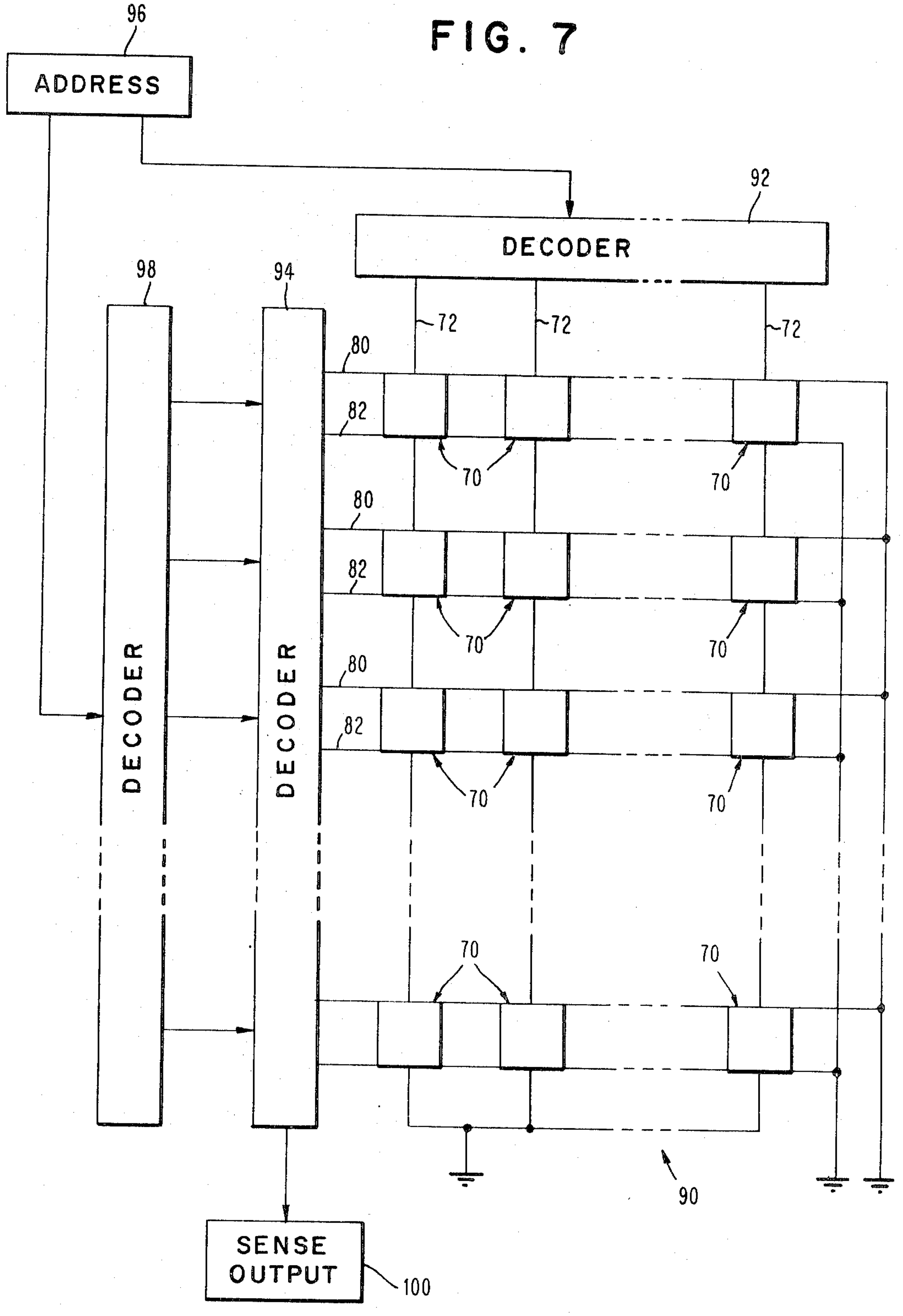
FIG. 7 schematically illustrates the memory array of FIG. 6, connected to decoders which are operated by an address.

FIGS. 6 and 7 show a memory circuit using memory cells having tunnel devices according to either FIG. 1 or FIG. 2. The basic circuit for the memory cell is that of FIG. 3, with the exception that each branch A, B of the circuit contains a tunnel device.

For an explanation of the operation of such a memory circuit using Josephson tunneling devices, reference can be made to aforementioned U.S. patent application, Ser. No. 744,949.

A brief description of the operation of such a memory circuit will now be given, although it is to be understood that, for more detail, reference should be made to the aforementioned copending patent application. In FIG. 6, a memory array is shown in which each memory cell 70 comprises an input portion, or stem 72 (which is a word line), which divides into two like portions A, B before reuniting into the stem portion 74 for the next memory cell. A pair of tunneling devices 76, 78, which might be Josephson tunneling devices, are associated with like portions A and B respectively. Although the Josephson tunnel devices are shown as two junction devices, any number of junctions can exist in each device. The array of memory cells is supported on insulating substrate 81.

Common bit lines 80 are shown extending across each row of memory cells. These bit lines are located directly over the underlying Josephson tunnel devices, but are separated from the top electrode of the Josephson devices by a layer of insulation which is not shown. The direction of current flow in the bit lines assists in writing either a "1" or "0" into the memory cells.

Sense lines 82, common to each row of memory cells, are strung across and below the memory cells in the same manner as the common bit lines 80, which are strung across and above the memory cells located in the same row. Each sense line has a Josephson tunneling device 84 that is inductively associated with device 78 of leg portion B of each memory cell 70. Although tunnel devices 84 are shown as having only one tunnel junction for ease of drawing, it is to be understood that these are also multijunction devices, similar to tunnel devices 76, 78. Consequently, each common sense line 82 is superimposed below the portion of each memory cell defined by legs A The sense line is energized with current only during the read operation. Sense lines 82 are insulated from stem portions 74 by insulation 85.

In FIG. 7, a system is shown using address and decoder circuits, which decoder circuits are similar to that shown in FIG. 5. Reference 90 generally designates the memory array. Decoder 92 is connected to word lines 72 of the memory array 90 while decoder 94 is connected to the common bit 80 and sense 82 lines. Address unit 96 is associated with decoder 98, which addresses depict the selection of the chosen branch of the decoder 92 by means of the address lines being in cooperative association therewith. Address unit 96 is also associated in a similar manner with decoder 98. Decoder 94 serves to accept inputs from decoder 98 to operate the common bit lines 80 and the common sense lines 82 that are connected to decoder 94. The voltage step that occurs when the sense Josephson gates 84 of a sense line 82 switch to a high-voltage state is detected and identified by sense output 100 which is connected to decoder 94. The sense output 100 is any switchable voltage step indicating device or apparatus. All the word lines are connected together to ground, and all the bit lines are connected to ground. In addition, all of the sense lines are connected together to ground.

In operation, writing is accomplished by the simultaneous energization of the word line 72 containing the selected memory cell and a common bit line 80 which controls switching of one of the Josephson tunneling gates 76, 78 of that memory cell, if the memory cell is not already in a state that the writing operation is to produce. The state of the memory cell is determined by the direction of the circulating currents in the cell and the application of current in one direction or the opposite direction in the common bit line. This writes a "1" or a "0" into the memory cell.

For reading, the common sense line 82 associated with the cells 70 of a particular row is energized simultaneously with the energization of the selected word line 72. The sense line reads or detects only a "1" state in the memory cell. The readout occurs when the Josephson tunneling gate 84 of the sense line which is in cooperative relationship with a memory cell having a "1" stored therein switches its voltage state.

Although only a limited description of the actual operation of the memory array of FIG. 6 and 7 has been given, detailed explanations of the operation are readily available by reference to the above-mentioned patent application. That application also shows the type of decoder circuits which work most advantageously and outlines a fabrication technique for producing the memory. In the present discussions, it should be apparent that the memory array of this application operates in a similar manner to that of the referenced copending application even though the individual Josephson tunneling devices contain multijunctions, in contrast with the single junction devices used in the aforementioned copending application.

While the invention has been described in terms of tunnel devices having multijunctions, a very suitable tunnel device comprises at least one superconductive tunnel junction having two voltage states, and in particular a Josephson tunneling device. Although only switching circuits and memory applications have been specifically set forth, it is to be understood that the teaching of this invention applies to any tunnel device and circuitry in which the problem of electrical shorts is especially prevalent. Of course, because of the very thin barrier layers in Josephson tunneling devices, the invention has particular flexibility in those circuits where Josephson tunneling devices are employed. Also, the invention is not limited to a particular class of materials in the tunnel devices, but includes tunnel devices fabricated from any material and by any process.

What is claimed is:

1. A Josephson tunneling device, comprising:
a first superconducting electrode,
a second superconducting electrode,
a plurality of noncoplanar tunnel junctions arranged in a series electrical path between said first and second electrodes, said junctions being capable of supporting Josephson tunneling current therethrough.

2. The device of claim 1, where there are at least three Josephson junctions located between said first and second superconducting electrodes.

3. The device of claim 1, wherein said noncoplanar junctions are formed in a plurality of discrete stacks located between said first and second superconducting electrodes thereby providing parallel Josephson tunneling current paths between said first and second superconducting electrodes, each said stack containing a plurality of noncoplanar tunnel junctions in a series electrical path, each junction being capable of supporting Josephson tunneling current therethrough.

4. A Josephson tunneling device, comprising:
a first superconducting layer,
a first tunnel barrier located on said first layer capable of supporting Josephson tunneling current therethrough,
a second superconducting layer located on said first tunnel barrier, a second tunneling barrier located on said second superconducting layer capable of supporting Josephson tunneling current therethrough,
a third superconducting layer located on said second tunnel barrier,
wherein said first and second tunnel barriers are noncoplanar and connected in a series electrical path between said first and third superconducting layers.

5. The device of claim 4, wherein each said tunnel barrier is comprised of an insulating layer 2–50 angstroms thick.

6. The device of claim 4, having control means for regulating the Josephson current switching threshold of each tunnel barrier.

7. A Josephson current device comprising:
a first superconducting electrode for carrying said Josephson current,
a plurality of discrete stacks located on said first electrode, each stack being comprised of alternate layers of tunnel barriers and superconductive layers, said tunnel barriers being able to support Josephson tunneling current therethrough,
a second superconducting electrode located over said stacks and bridging said stacks for carrying said Josephson current.

8. The device of claim 7, where each said tunnel barrier is an insulator 2–50 angstroms thick.

9. The device of claim 7, where said stacks provide parallel Josephson tunneling current paths between said first and second electrodes.

* * * * *